US008677024B2

(12) United States Patent
Baratakke et al.

(10) Patent No.: US 8,677,024 B2
(45) Date of Patent: Mar. 18, 2014

(54) AGGREGATING SHARED ETHERNET ADAPTERS IN A VIRTUALIZED ENVIRONMENT

(75) Inventors: Kavitha Vittal Murthy Baratakke, Round Rock, TX (US); Shaival Jagdishbhai Chokshi, Round Rock, TX (US); Nikhil Hegde, Round Rock, TX (US); Vishal Ramachandra Mansur, Hubli (IN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 13/076,931

(22) Filed: Mar. 31, 2011

(65) Prior Publication Data

US 2012/0254863 A1  Oct. 4, 2012

(51) Int. Cl.
*G06F 15/16* (2006.01)
*G06F 9/455* (2006.01)

(52) U.S. Cl.
USPC .............................. 709/250; 718/1

(58) Field of Classification Search
USPC ........................................ 709/250
See application file for complete search history.

(56) References Cited

U.S. PATENT DOCUMENTS

| 6,553,029 | B1* | 4/2003 | Alexander | 370/389 |
|---|---|---|---|---|
| 7,478,173 | B1* | 1/2009 | Delco | 709/250 |
| 8,385,356 | B2* | 2/2013 | Armstrong et al. | 370/401 |
| 2004/0215858 | A1* | 10/2004 | Armstrong et al. | 710/200 |
| 2005/0129040 | A1* | 6/2005 | Kiel et al. | 370/412 |
| 2006/0123204 | A1* | 6/2006 | Brown et al. | 711/153 |
| 2006/0221832 | A1* | 10/2006 | Muller et al. | 370/235 |
| 2006/0250945 | A1* | 11/2006 | Fernandes et al. | 370/216 |
| 2007/0098006 | A1* | 5/2007 | Parry et al. | 370/437 |
| 2007/0127367 | A1* | 6/2007 | Ogasahara et al. | 370/226 |
| 2007/0266179 | A1* | 11/2007 | Chavan et al. | 709/250 |
| 2008/0189417 | A1 | 8/2008 | Dea et al. | |
| 2008/0205387 | A1* | 8/2008 | Wakumoto | 370/389 |
| 2009/0037907 | A1* | 2/2009 | Armstrong et al. | 718/1 |
| 2009/0135840 | A1 | 5/2009 | Murray et al. | |
| 2009/0307687 | A1* | 12/2009 | Nevarez et al. | 718/1 |
| 2010/0214949 | A1* | 8/2010 | Smith et al. | 370/254 |
| 2010/0223419 | A1* | 9/2010 | Cardona et al. | 711/6 |
| 2010/0312868 | A1* | 12/2010 | Das et al. | 709/223 |
| 2010/0325257 | A1* | 12/2010 | Goel et al. | 709/223 |
| 2012/0033665 | A1* | 2/2012 | Da Silva et al. | 370/389 |
| 2012/0033669 | A1* | 2/2012 | Mohandas et al. | 370/392 |
| 2012/0063465 | A1* | 3/2012 | Keesara et al. | 370/401 |
| 2012/0102562 | A1* | 4/2012 | Chokshi et al. | 726/12 |

OTHER PUBLICATIONS

Blank et al, Advanced POWER Virtualization on IBM System p5, Redbooks, IBM (Dec. 2005).*

(Continued)

*Primary Examiner* — David Lazaro
*Assistant Examiner* — Robert Shaw
(74) *Attorney, Agent, or Firm* — Mark Vallone; Nicholas L. Cadmus

(57) ABSTRACT

In a method for managing shared Ethernet adapters in a virtualized computer environment, a computer programmed with a hypervisor program receives a first request from a virtual client to transmit data. In response to receiving the first request, the computer programmed with the hypervisor program selects a first active virtual server from a first plurality of concurrently active virtual servers of the virtualized computer environment. The computer programmed with the hypervisor program copies the data from a memory of the virtual client to a trunk adapter of a first shared Ethernet adapter of the selected first active virtual server.

20 Claims, 5 Drawing Sheets

(56) References Cited

OTHER PUBLICATIONS

Adra et al. "IBM System p Advanced POWER Virtualization Best Practices." Redpaper. International Business Machines Corporation, Oct. 2006.*
Abbott et al, Advanced POWER Virtualization Deployment Examples, IBM RedBook (Feb. 2007).*
Miller et al Using Virtual Switches in PowerVM to Drive Maximum Value of 10 Gb Ethernet, IBM , Sep. 2010.*
Griffiths, "POWER5 Virtualization: How to work with VLANs using the IBM Virtual I/O Server", http://www.ibm.com/developerworks/systems/library/es-pwr5-virtualvlan/index.html.*
Armstrong et al, Advanced Virtualization Capabilities of POWER5 systems, IBM J. Res. & Dev. vol. 49 No. 4/5 Jul./Sep. 2005, pp. 523-532.*
Boutcher et al "Linux Virtualization on IBM POWER5 Systems," in Proceedings of the Linux Symposium, vol. 1, Jul. 2004, pp. 113-120.*
B. Adra et al. "IBM System p Advanced POWER Virtualization Best Practices." Redpaper. International Business Machines Corporation, Oct. 2006.
SYSKONNECT GmbH. "Link Aggregation According to IEEE 802.3ad." White Paper. V1.10, Oct. 10, 2002.
"Session Title: Advanced POWER6 Virtual I/O Configurations Overview, Session ID: pVI11." IBM Corporation, IBM Power Systems Technical University, Chicago, IL. Sep. 2008.
"Advanced Power6 Virtual I/O Configuration Overview." IBM Corporation. Copyright 2009.

* cited by examiner

AGGREGATING SHARED ETHERNET ADAPTERS IN A VIRTUALIZED ENVIRONMENT

FIELD OF THE INVENTION

The present invention relates generally to virtualized computer environments, and more specifically to managing Ethernet adapters in a virtualized computer environment.

BACKGROUND

System virtualization creates several virtual systems within a single physical system. Each virtual system is a logical division or sharing of physical resources, such as a percentage of real processor capacity, an amount of real memory, an amount of storage and a percentage of network I/O capacity. While a specific real processor can in some cases be allocated to a virtual system, the virtual system is not a self-contained computer containing the real processor but is formed with other virtual systems from the same real computer. Virtualization of resources can also be implemented by combining multiple physical resources into shared pools from which virtual resources may be retrieved and shared by multiple entities. In some computer platforms virtualization is implemented by logical partitions of physical resources.

FIG. 1 illustrates a known real computer 100 including a failover configuration according to the prior art. Real computer 100 includes a hypervisor or logical partitioning program 112 to logically divide the physical resources of real computer 100 into multiple logical partitions (LPARs) 103a-e. A Virtual I/O Client (VIOC) system and a Virtual I/O Server (VIOS) system can be formed in separate LPARs in the same or different real computers by installation of I/O client software and I/O server software in the respective LPARs. In the example illustrated in FIG. 1, VIOCs 104a-c are formed in respective LPARs 103a-c, and VIOSs 104d-e are formed in respective LPARs 103d-e in the same real computer 100. Hypervisor program 112 forms LPARs 103a-e from the physical resources of real computer 100, performs standard operating system functions, and manages the communication between LPARs 103a-e via virtual switch 114. VIOCs 104a-c have respective virtual Ethernet adapters 106a-c for communicating with one another. VIOSs 104d-e have respective virtual Ethernet adapters 106d-e for communicating with VIOCs 104a-c. VIOSs 104d-e provide virtualized network resources to VIOCs 104a-c via respective shared Ethernet adapters (SEA) 108a-b which bridge respective physical Ethernet adapters 110a-b to respective virtual Ethernet adapters 106a-e. Physical Ethernet adapters 110a-b connect real computer 100 to external network 120 via respective physical switches 122a-b. Hypervisor program 112 is a thin layer of software that copies data from the memory of one of VIOCs 104a-c to memory of one of VIOSs 104d-e when the one of VIOCs 104a-c sends a request to transmit data to external network 120.

In a failover configuration, each SEA is given a priority value to determine which SEA, and in turn which VIOS, will serve as the primary and which will serve as the backup. In the example illustrated in FIG. 1, VIOS 104d serves as a primary VIOS and VIOS 104e serves as a failover VIOS. In other words, virtual switch 114 and Remote Direct Memory Access (RDMA) program 116 route data to external network 120 through SEA 108a of VIOS 104d while SEA 108b of VIOS 104e remains inactive. When VIOS 104d fails, VIOS 104d notifies VIOS 104e via control channel 124 to become the primary VIOS and receive routed data to transmit to external network 120. As a result, network bandwidth is not optimally utilized since network bandwidth of VIOS 104e is unutilized while in failover mode. Also, transitioning to the failover VIOS 104e in the prior art is not seamless when primary VIOS 104d fails because transitioning to a failover VIOS requires updating a MAC table with the IP address of the failover VIOS. The update typically causes a delay which results in lost data packets.

SUMMARY

In a first embodiment of the present invention, there is a method for managing shared Ethernet adapters in a virtualized computer environment. A computer programmed with a hypervisor program receives a first request from a virtual client to transmit data. In response to receiving the first request, the computer programmed with the hypervisor program selects a first virtual server from a first plurality of concurrently active virtual servers of the virtualized computer environment. The computer programmed with the hypervisor program copies the data from a memory of the virtual client to a trunk adapter of a first shared Ethernet adapter program of the selected first active virtual server.

In a second embodiment of the present invention, there is a computer program product for managing shared Ethernet adapters in a virtualized computer environment. The computer program product comprises one or more computer-readable tangible storage devices and program instructions stored on at least one of the one or more storage devices. The program instructions comprise first program instructions to receive a request from a virtual client to transmit data. The program instructions further comprise second program instructions to select a first active virtual server from a first plurality of concurrently active virtual servers of the virtualized computer environment. The program instructions further comprise third program instructions to copy the data from a memory of the virtual client to a trunk adapter of a first shared Ethernet adapter of the selected first active virtual server.

In a third embodiment of the present invention, there is a computer system for managing shared Ethernet adapters in a virtualized computer environment. The computer system comprises one or more processors, one or more computer-readable memories, one or more computer-readable tangible storage devices, and program instructions stored on at least one of the one or more storage devices for execution by at least one of the one or more processors via at least one of the one or more memories. The program instructions comprise first program instructions to receive a request from a virtual client to transmit data. The program instructions further comprise second program instructions to select a first active virtual server from a first plurality of concurrently active virtual servers of the virtualized computer environment. The program instructions further comprise third program instructions to copy the data from a memory of the virtual client to a trunk adapter of a first shared Ethernet adapter of the selected first active virtual server.

DETAILED DESCRIPTION

Figure 1:
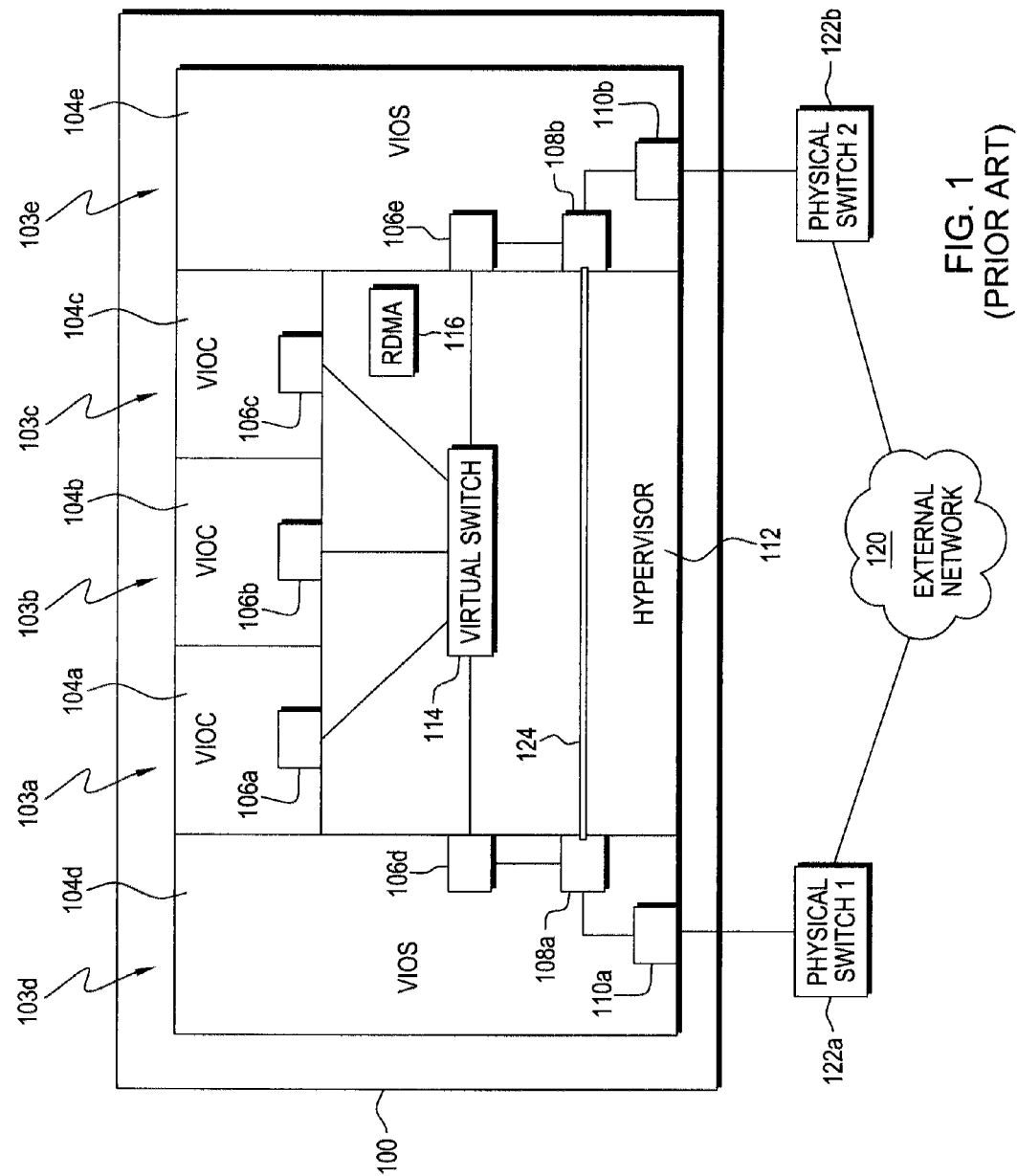
FIG. 1 illustrates a real computer including a failover configuration according to the prior art.
Figure 2:
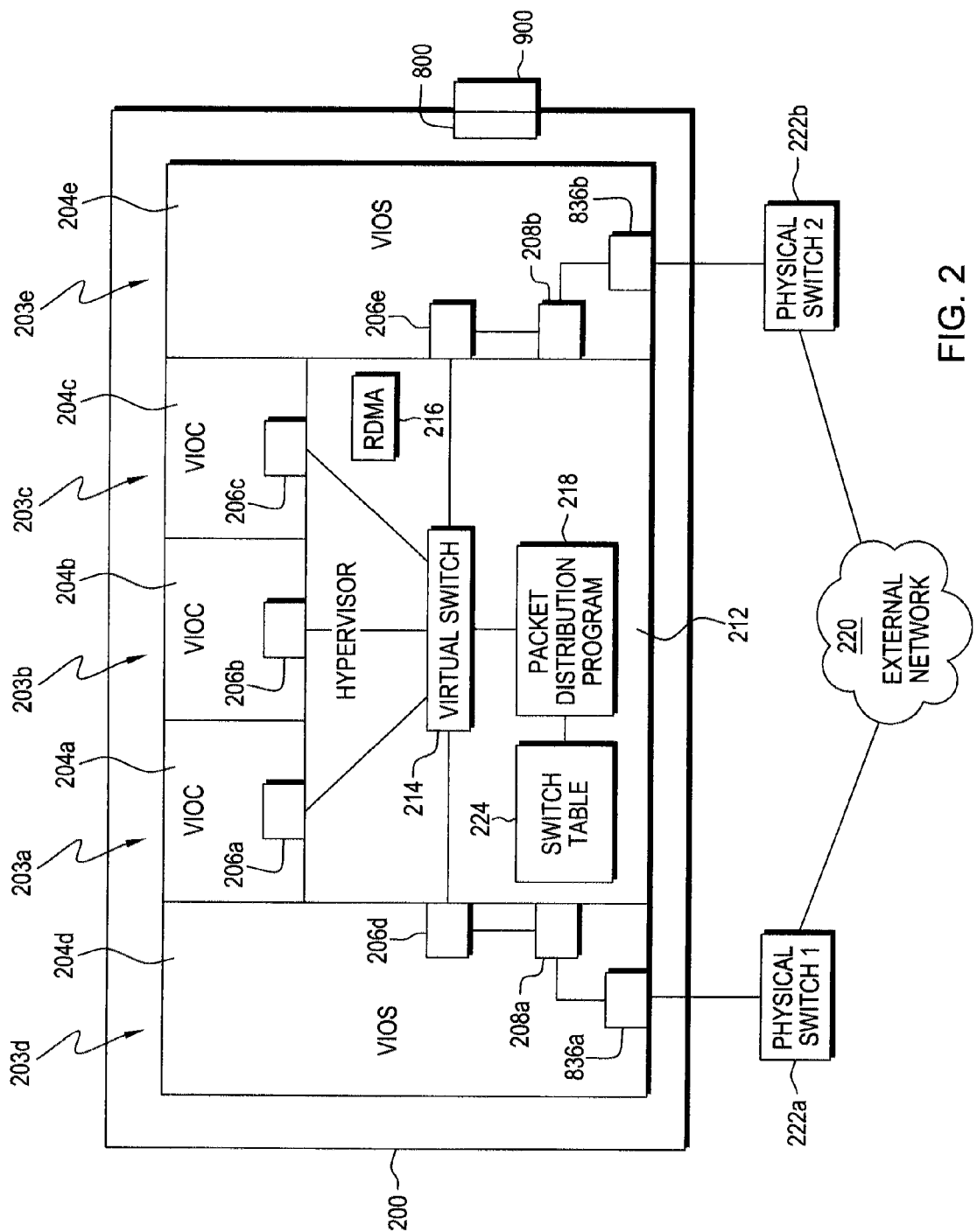
FIG. 2 illustrates a computer system for aggregating shared Ethernet adapters in a virtualized computer environment, according to one embodiment of the present invention.

The present invention will now be described in detail with reference to the Figures. FIG. 2 illustrates a real computer generally designated 200 for aggregating shared Ethernet adapters in a virtualized computer environment, according to one embodiment of the present invention. Real computer 200 includes a hypervisor or logical partitioning program 212 to logically divide the real resources (i.e., processors, RAM, disk storage, I/O, etc.) of real computer 200 into multiple logical partitions (LPARs) 203a-e. In the illustrated example, Virtual I/O Clients (VIOCs) 204a-c are formed in respective LPARs 203a-c by installation of I/O client programs in respective LPARs 203a-c, and Virtual I/O Servers (VIOS) 204d-e are formed in respective LPARs 203d-e by installation of I/O server programs in respective LPARs 203d-e. One of skill in the art will appreciate that, in other embodiments, there can be a different number of LPARs in real computer 200, each formed into a VIOC or a VIOS. VIOCs 204a-c include respective virtual Ethernet adapters 206a-c for communicating with one another. VIOCs 204d-e also include respective virtual Ethernet Adapters 206d-e for communicating with respective VIOCs 204a-c. Shared Ethernet adapters (SEA) 208a-b interface to respective physical Ethernet adapters 836a-b which connect real computer 200 and respective VIOSs 204d-e to external network 220 via respective physical switches 222a-b.

Hypervisor program 212 forms LPARs 203a-e from the real resources of real computer 200, performs standard operating system functions, and manages requests to transmit data packets between LPARs 203a-e and external network 220. Hypervisor program 212 has a virtual switch 214 for routing data transmit requests from a sending VIOC, e.g., VIOC 204a, to one of VIOSs 204d-e via one of SEAs 208a-b. Hypervisor program 212 has a Remote Data Memory Access (RDMA) program 216 to directly copy data packets, associated with the request, from a memory of the sending VIOC to a memory of one of VIOSs 204d-e.

In the example illustrated in FIG. 2, both SEAs 208a-b are simultaneously active. In other words, VIOS 204d is available to transmit data packets to external network 220 upon receiving routed data transmit requests from virtual switch 214 via SEA 208a, and VIOS 204e is available to transmit data packets to external network 220 upon receiving routed data transmit requests from virtual switch 214 via SEA 208b. Also, VIOSs 204d-e are able to receive data packets from external network 220. Although FIG. 2 illustrates real computer 200 having two simultaneously active VIOSs 204d-e, it should be understood that real computer 200 may include more than two VIOSs, any combination of which may be simultaneously active.

Hypervisor program 212 has a packet distribution program 218 to select one of VIOSs 204d-e to transmit data packets to external network 220. Virtual switch 214 communicates with packet distribution program 218 to determine to which of VIOSs 204d-e virtual switch 214 should route data packets. In one example embodiment, if more than one of VIOSs 204d-e are active, packet distribution program 218 can distribute packets among both active VIOSs 204d-e without regard for priorities of VIOSs 204d-e.

In an example embodiment, if more than one of VIOSs 204d-e are active, packet distribution program 218 uses a user-configurable algorithm to select one of VIOSs 204d-e to which virtual switch 214 should route data packets, such as a round robin algorithm, a hash-based algorithm, or other similar algorithm. A round robin algorithm selects a VIOS identified at a position in a list identifying active VIOSs, and then either increments the position in the list if the position is not at the end of the list, or sets the position to the beginning of the list if the position is at the end of the list. A hash-based algorithm calculates a hash value by applying a hash function based on the source and destination MAC address of a received data transmit request, and selects a VIOS identified in a position represented by the hash value in a hash table containing a list identifying available VIOSs. The algorithm used by the packet distribution program 218 is configurable through a hardware management console as later illustrated in FIG. 5.

Hypervisor program 212 has a switch table 224 that aggregates SEAs 208a-b by storing information about the states of respective VIOSs 204d-e, each state indicating whether a VIOS is active or not. Packet distribution program 218 accesses switch table 224 to determine which of VIOSs 204d-e are available for transmitting data packets. Switch table 224 may be predefined and later adjusted by a network administrator. For example, a network administrator may initially activate both VIOS 204d and VIOS 204e. A network administrator may later choose to temporarily disable VIOS 204d to, for example, permit a software update, and therefore update switch table 224 accordingly.

Packet distribution program 218 may also update switch table 224 in real time. For example, if VIOS 204d fails or if physical switch 222a fails, virtual switch 214 will ordinarily detect the failure and automatically instruct packet distribution program 218 to change the state of VIOS 204d in switch table 224 to inactive. Thereafter, packet distribution program 218 will avoid selecting VIOS 204d for transmitting data packets to external network 220 until switch table 224 is updated to indicate that VIOS 204d has become active. Packet distribution program 218 will instead select the active VIOS 204e for transmitting data packets to external network 220. Once VIOS 204d becomes active again, packet distribution program 218 will resume routing requests to transmit data to VIOS 204d according to the user-configurable algorithm.

Additionally, when a physical network associated with SEA 208a fails, in which case SEA 208a becomes non-functional, virtual switch 214 will temporarily disable a trunk adapter corresponding to SEA 208a. Since the trunk adapter acts as a virtual port in hypervisor program 212's virtual switch 214, a temporarily disabled trunk adapter indicates that the trunk is unusable. This allows hypervisor program 212 to ignore the disabled virtual port and continue using another SEA, such as SEA 208b, configured on another VIOS, such as VIOS 204e.

Thus, virtual switch 214 seamlessly re-routes data transmit requests to an active VIOS when another VIOS becomes inactive. Additionally, virtual switch 214 efficiently utilizes network bandwidth of multiple VIOSs while maintaining failover capabilities by intelligently routing data transmit requests to appropriate VIOSs.

Figure 3:
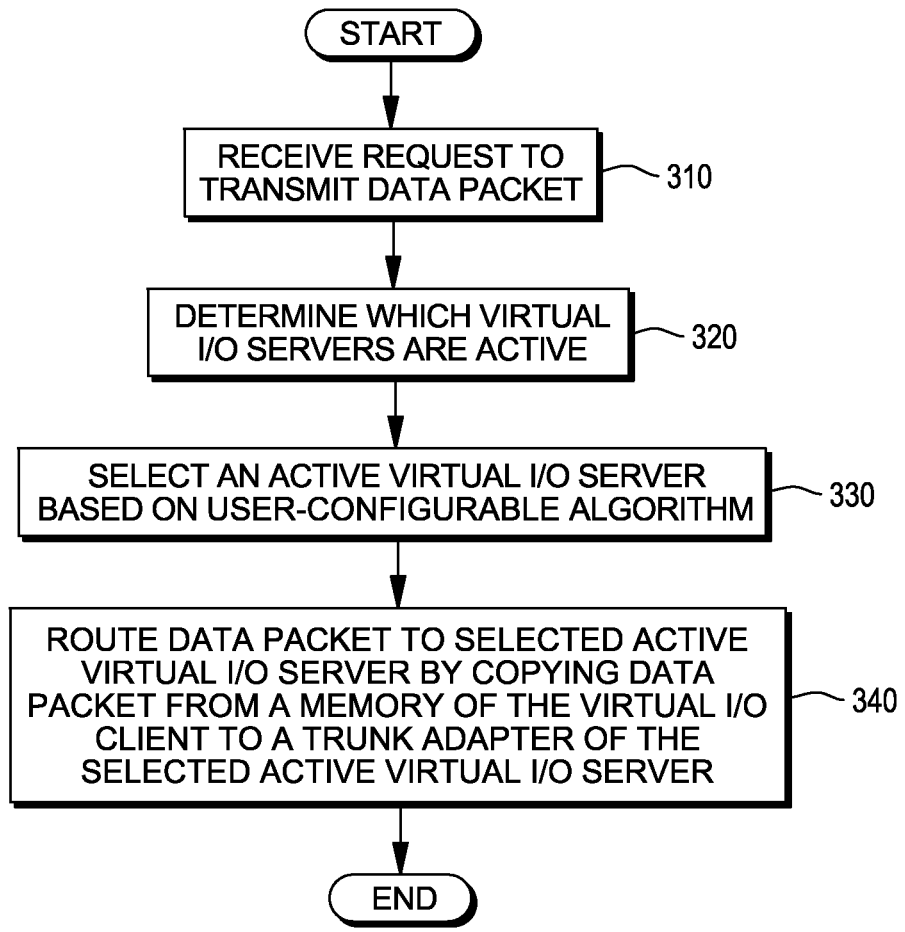
FIG. 3 illustrates a flow chart of aggregating shared Ethernet adapters in the virtualized computer environment of FIG. 2, according to one embodiment of the present invention.

FIG. 3 illustrates a flow chart of aggregating shared Ethernet adapters in the virtualized computer environment of FIG. 2, according to one embodiment of the present invention. At step 310, virtual switch 214 of hypervisor program 212 receives a request from a sending VIOC 204a to transmit a data packet to external network 220. At step 320, packet distribution program 218 determines which of VIOSs 204d-e are active by accessing switch table 224. Switch table 224 contains information about the status, e.g., active or inactive, of each of VIOSs 204d-e. Switch table 224 may be predefined and later adjusted by a network administrator. Virtual switch 214 may also utilize packet distribution program 218 to update the status of VIOSs 204d-e in switch table 224 in real time.

At step 330, packet distribution program 218 selects one of the active VIOSs based on a user-configurable algorithm and notifies virtual switch 214 of the selected active VIOS. The user-configurable algorithm can be, for example, a round-robin algorithm, a hash-based algorithm, or other similar algorithm to select an active VIOS. The algorithm is pre-configured through a hardware management console. At step 340, virtual switch 214 routes the request to transmit data to the selected active VIOS, e.g., VIOS 204d, via the SEA connecting the selected VIOS, e.g., SEA 208a, to external network 220. Virtual switch 214 routes data by copying data from memory of sending VIOC 204a to a trunk adapter of the selected active VIOS.

Figure 4:
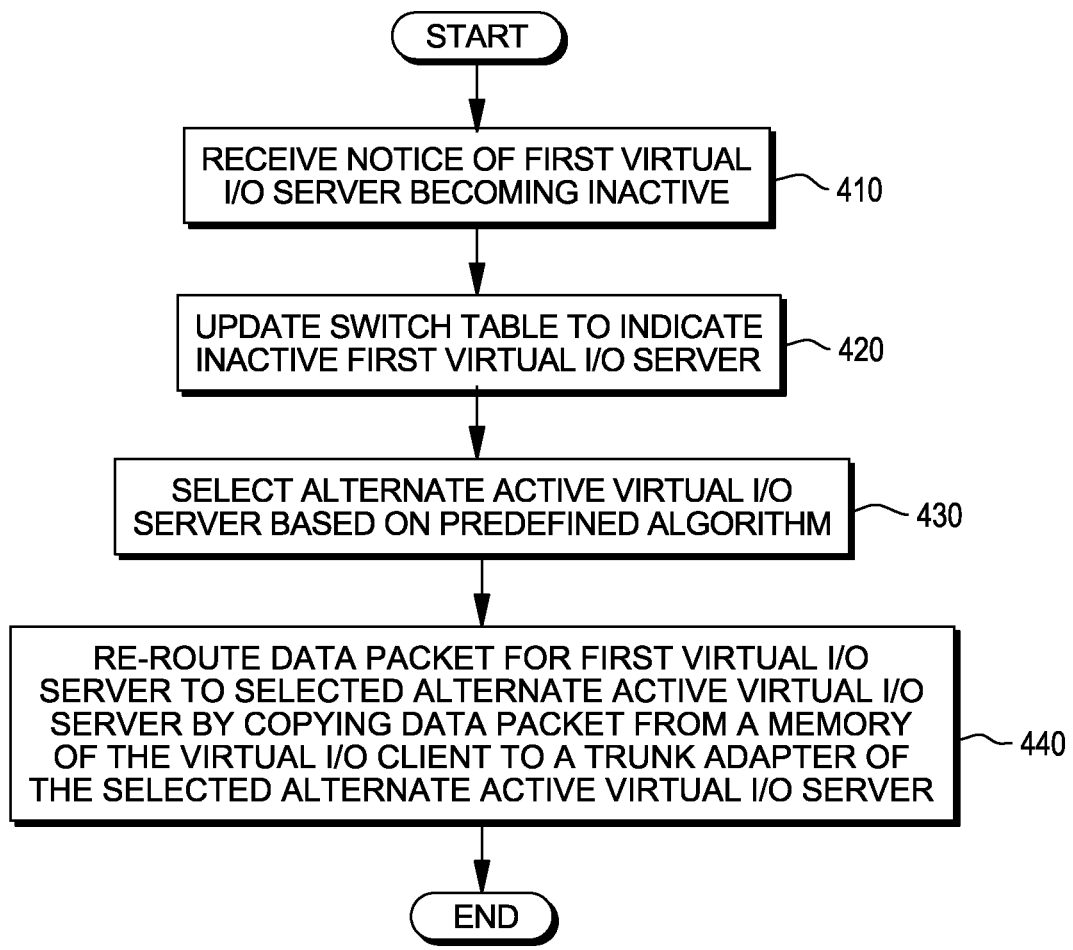
FIG. 4 illustrates a flow chart further detailing aggregating shared Ethernet adapters in the virtualized computer environment of FIG. 2, according to another embodiment of the present invention.

FIG. 4 illustrates a flow chart further detailing aggregating shared Ethernet adapters in the virtualized computer environment of FIG. 2, according to another embodiment of the present invention. It should be understood that in the example illustrated in FIG. 4, both VIOS 204d and VIOS 204e are initially active. At step 410, packet distribution program 218 of hypervisor program 212 receives notice of VIOS 204d becoming inactive. VIOS 204d may become inactive as a result of VIOS 204d or associated physical switch 222a failing. In this example, virtual switch 214 sends the notice to packet distribution program 218 in response to detecting a failed VIOS 204d or failed physical switch 222a. VIOS 204d may also become inactive as a result of a network administrator temporarily disabling VIOS 204d to, for example, allow for a software update. Thus, since packet distribution program 218 of hypervisor program 212 is able to detect temporarily disabled or failed VIOS 204d, packet distribution program 218 is able to adjust, in real time, how packet distribution program 218 routes packets by avoiding routing packets to SEA 208a associated with failed VIOS 204d. At step 420, packet distribution program 218 updates switch table 224 to indicate that VIOS 204d, and associated SEA 208a, is inactive.

At step 430, packet distribution program 218 accesses switch table 224 to determine the active VIOSs and selects an active VIOS 204e based on a user-configurable algorithm. The user-configurable algorithm can be, for example, a round-robin algorithm, a hash-based algorithm, or other similar algorithm to select an active VIOS. At step 440, virtual switch 214 re-routes data packets received from VIOCs to selected active VIOS 204e. Virtual switch 214 re-routes data packets by copying data from memory of sending VIOC 204a to a trunk adapter of selected alternate VIOS 204e. VIOS 204e then sends the packets to external network 220.

Figure 5:
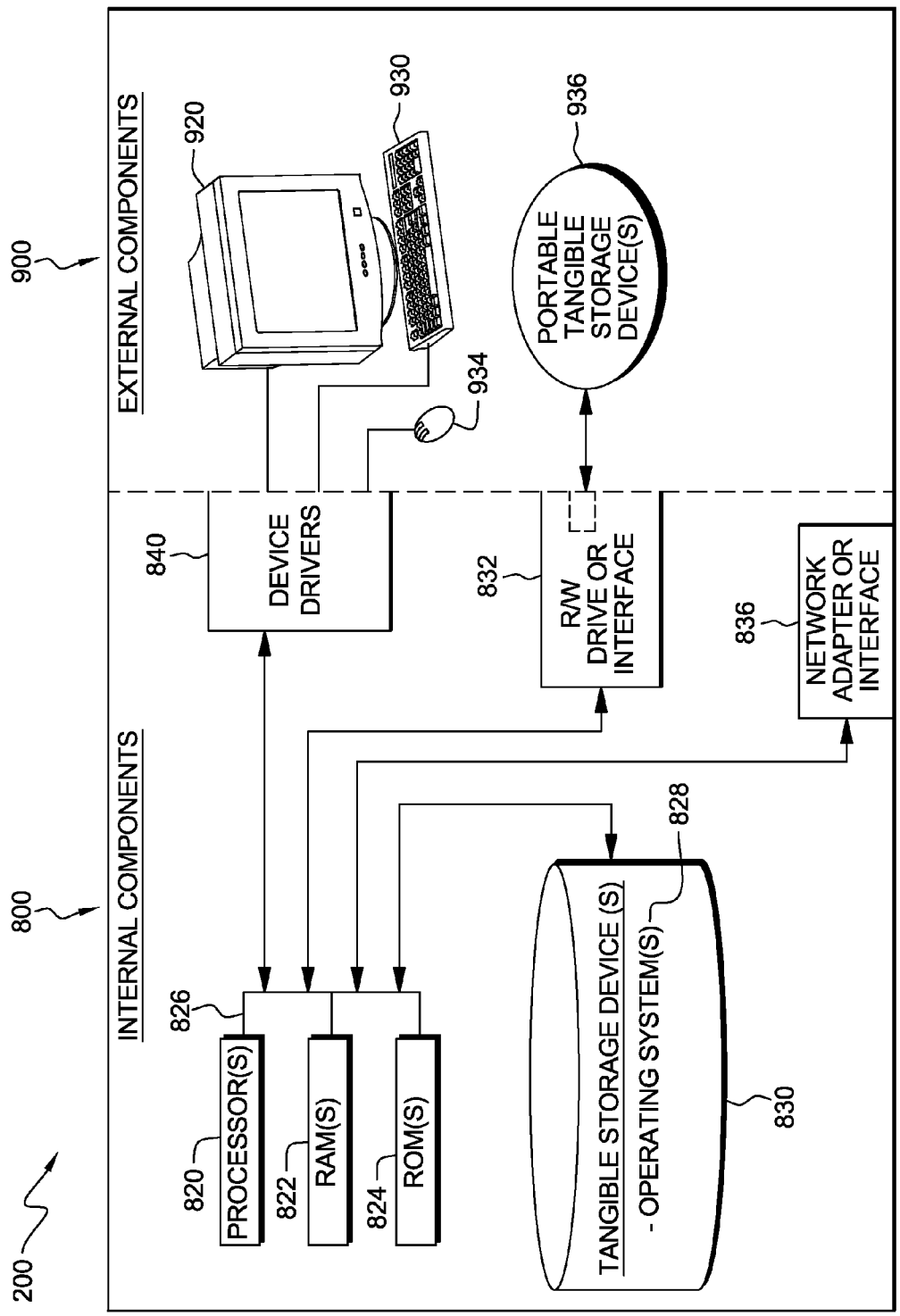
FIG. 5 illustrates internal and external real components of the computer of FIG. 2.

FIG. 5 illustrates internal and external real components of computer 200. Computer 200 includes internal components 800 and external components 900. Internal components 800 include one or more processors 820, one or more computer-readable RAMs 822 and one or more computer-readable ROMs 824 on one or more buses 826, and one or more guest operating systems 828 and one or more computer-readable tangible storage devices 830. The guest operating systems 828 execute in respective VIOCs and VIOSs to control execution of applications in the respective VIOCs and VIOSs, and are separate from hypervisor program 212. The one or more operating systems 828, hypervisor program 212, and packet distribution program 218 are stored on one or more of the computer-readable tangible storage devices 830 for execution by one or more of the processors 820 via one or more of the RAMs 822 (which typically include cache memory). Switch table 224 is also stored on one or more of the computer-readable tangible storage devices 830. In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. The hypervisor program 212 and packet distribution program 218 can be stored on one or more of the portable computer-readable tangible storage devices 936, read via R/W drive or interface 832 and loaded into one or more computer-readable tangible storage devices 830.

Internal components 800 also include a network adapter or interface 836 such as a network adapter card. The hypervisor program 212 and packet distribution program 218 can be downloaded to computer 200 from an external computer via a network (for example, the Internet, a local area network, or other wide area network) and network adapter or interface 836. From the network adapter or interface 836, the hypervisor program 212 and packet distribution program 218 are loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. A hardware management console for configuring packet distribution program 218, including the user-configurable algorithm used by packet distribution program 218, may comprise a combination of computer display 920, keyboard 930, and computer mouse 934. Internal components 800 also include device drivers 840 to interface to computer display monitor 920, keyboard 930, and computer mouse 934. The device drivers 840, R/W drive or interface 832, and network adapter or interface 836 comprise hardware and software (stored in one or more computer-readable tangible storage devices 830 and/or one or more computer-readable ROMs 824).

Hypervisor program 212 and packet distribution program 218 can be written in various programming languages including low-level, high-level, object-oriented or non object-oriented languages. Alternatively, the functions of hypervisor program 212, and packet distribution program 218 can be implemented in whole or in part by computer circuits and other hardware (not shown).

The description above has been presented for illustration purposes only. It is not intended to be an exhaustive description of the possible embodiments. One of ordinary skill in the art will understand that other combinations and embodiments are possible.

What is claimed is:

1. A method for managing shared Ethernet adapters in a virtualized computer environment, the method comprising the steps of:

a computer programmed with a hypervisor program receiving a first request from a virtual client to transmit data;

in response to receiving the first request, the computer programmed with the hypervisor program selecting a first active virtual server from a first plurality of concurrently active virtual servers of the virtualized computer environment, wherein the first plurality of concurrently active virtual servers are concurrently available to transmit data from the virtual client to an external network; and the computer programmed with the hypervisor program copying the data from a memory of the virtual client to a trunk adapter of a first shared Ethernet adapter of the selected first active virtual server.

2. The method of claim 1, further comprising the step of:

after the step of copying the data from the memory of the virtual client to the trunk adapter of the first shared Ethernet adapter of the selected first active virtual server, the computer programmed with the hypervisor program forwarding the data from the trunk adapter to an external network via a physical network adapter.

3. The method of claim 1, further comprising the step of:

prior to the step of selecting the first active virtual server from the first plurality of concurrently active virtual servers of the virtualized computer environment, the computer programmed with the hypervisor program accessing data in a switch table to determine the first plurality of concurrently active virtual servers from a plurality of virtual servers of the virtualized computer environment, wherein the data in the switch table comprises state information of the plurality of virtual servers.

4. The method of claim 3, wherein the state information comprises one of active state and inactive state.

5. The method of claim 3, further comprising the steps of:

the computer programmed with the hypervisor program receiving a notice of the selected first virtual server becoming inactive; and the computer programmed with the hypervisor program modifying the state information of the selected first virtual server in the switch table.

6. The method of claim 5, further comprising the steps of:

the computer programmed with the hypervisor program receiving a second request from a virtual client to transmit data;

the computer programmed with the hypervisor program accessing the switch table to determine a second active virtual server; and the computer programmed with the hypervisor program copying the data requested for transmission by the second request from a memory of the virtual client from which the second request was received to a trunk adapter of a second shared Ethernet adapter of the determined second active virtual server.

7. The method of claim 1, wherein the step of selecting the first active virtual server from the first plurality of concurrently active virtual servers comprises the computer programmed with the hypervisor program utilizing a user-configurable algorithm.

8. The method of claim 7, wherein the user-configurable algorithm is a hash-based algorithm based on a source media access control address and a destination media access control address.

9. A computer program product for managing shared Ethernet adapters in a virtualized computer environment, the computer program product comprising:

one or more computer-readable tangible storage devices and program instructions stored on at least one of the one or more storage devices, the program instructions comprising:

first program instructions to receive a request from a virtual client to transmit data;

second program instructions to select a first active virtual server from a first plurality of concurrently active virtual servers of the virtualized computer environment, wherein the first plurality of concurrently active virtual servers are concurrently available to transmit data from the virtual client to an external network; and third program instructions to copy the data from a memory of the virtual client to a trunk adapter of a first shared Ethernet adapter of the selected first active virtual server.

10. The computer program product of claim 9, wherein the program instructions further comprise:

fourth program instructions to access data in a switch table to determine the first plurality of concurrently active virtual servers from a plurality of virtual servers of the virtualized computer environment, wherein the data comprises state information of the plurality of virtual servers, the state information comprising one of active state and inactive state.

11. The computer program product of claim 10, wherein the program instructions further comprise:

fifth program instructions to receive a notice of the first selected virtual server becoming inactive; and sixth program instructions to modify the state information of the selected first virtual server in the switch table.

12. The computer program product of claim 11, wherein the program instructions further comprise:

seventh program instructions to access the switch table to determine a second active virtual server; and eighth program instructions to copy the data from the memory of the virtual client to a trunk adapter of a second shared Ethernet adapter of the determined second active virtual server.

13. The computer program product of claim 9, wherein the second program instructions select the first active virtual server from the first plurality of concurrently active virtual servers by utilizing a user-configurable algorithm.

14. The computer program product of claim 13, wherein the user-configurable algorithm is a hash-based algorithm based on a source media access control address and a destination media access control address.

15. A computer system for managing shared Ethernet adapters in a virtualized computer environment, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

first program instructions to receive a request from a virtual client to transmit data;

second program instructions to select a first active virtual server from a first plurality of concurrently active virtual servers of the virtualized computer environment, wherein the first plurality of concurrently active virtual servers are concurrently available to transmit data from the virtual client to an external network; and third program instructions to copy the data from a memory of the virtual client to a trunk adapter of a first shared Ethernet adapter of the selected first active virtual server.

16. The computer system of claim 15, wherein the program instructions further comprise:
fourth program instructions to access data in a switch table to determine the first plurality of concurrently active virtual servers from a plurality of virtual servers of the virtualized computer environment, wherein the data comprises state information of the plurality of virtual servers, the state information comprising one of active state and inactive state.

17. The computer system of claim 16, wherein the program instructions further comprise:
fifth program instructions to receive a notice of the selected first virtual server becoming inactive; and
sixth program instructions to modify the state information of the selected first virtual server in the switch table.

18. The computer system of claim 17, wherein the program instructions further comprise:
seventh program instructions to access the switch table to determine a second active virtual server; and
eighth program instructions to copy the data from the memory of the virtual client to a trunk adapter of a second shared Ethernet adapter of the determined second active virtual server.

19. The computer system of claim 15, wherein the second program instructions select the first virtual server from the plurality of concurrently active virtual servers by utilizing a user-configurable algorithm.

20. The computer program product of claim 19, wherein the user-configurable algorithm is a hash-based algorithm based on a source media access control address and a destination media access control address.

* * * * *